United States Patent
Porras et al.

(10) Patent No.: US 6,704,874 B1
(45) Date of Patent: Mar. 9, 2004

(54) NETWORK-BASED ALERT MANAGEMENT

(75) Inventors: Phillip Andrew Porras, Cupertino, CA (US); Martin Wayne Fong, San Francisco, CA (US)

(73) Assignee: SRI International, Inc., Menlo Park, CA (US)

(*) Notice: Subject to any disclaimer, the term of this patent is extended or adjusted under 35 U.S.C. 154(b) by 481 days.

(21) Appl. No.: 09/626,547

(22) Filed: Jul. 25, 2000

Related U.S. Application Data

(63) Continuation-in-part of application No. 09/188,739, filed on Nov. 9, 1998, now Pat. No. 6,321,338.

(51) Int. Cl.[7] ............................................. G06F 11/30
(52) U.S. Cl. ................................. 713/201; 709/224
(58) Field of Search .................. 713/200, 201; 709/223, 224; 714/48

(56) References Cited

U.S. PATENT DOCUMENTS

| | | | |
|---|---|---|---|
| 4,672,609 A | 6/1987 | Humphrey et al. | 371/21 |
| 4,773,028 A | 9/1988 | Tallman | 364/550 |
| 5,210,704 A | 5/1993 | Husseiny | 364/551.01 |
| 5,440,723 A | 8/1995 | Arnold et al. | |
| 5,539,659 A | 7/1996 | McKee et al. | 709/224 |
| 5,557,742 A | 9/1996 | Smaha et al. | 395/186 |
| 5,706,210 A | 1/1998 | Kumano et al. | 709/224 |
| 5,748,098 A | 5/1998 | Grace | 340/825.16 |
| 5,790,799 A | 8/1998 | Mogul | 709/224 |
| 5,878,420 A * | 3/1999 | de la Salle | 707/10 |
| 5,919,258 A | 7/1999 | Kayashima et al. | |
| 5,922,051 A | 7/1999 | Sidey | 709/223 |
| 5,940,591 A | 8/1999 | Boyle et al. | 395/187.01 |
| 5,974,237 A | 10/1999 | Shurmer et al. | 709/224 |
| 5,974,457 A | 10/1999 | Waclawshy et al. | 709/224 |

(List continued on next page.)

FOREIGN PATENT DOCUMENTS

| | | | |
|---|---|---|---|
| WO | 99/13427 | 3/1999 | G06K/7/00 |
| WO | 99/57626 | 11/1999 | G06F/1/16 |
| WO | 00/10278 | 2/2000 | |
| WO | 00/25214 | 5/2000 | G06F/12/14 |
| WO | 00/25527 | 5/2000 | H04Q/3/00 |
| WO | 00/34867 | 6/2000 | G06F/11/30 |
| WO | 02/101516 | 12/2002 | |

OTHER PUBLICATIONS

Debar, et al., "Towards a Taxonomy of Intrusion–Detection Systems," Computer Networks 31 (1999), 805–822.

Garvey, et al, "An Inference Technique for Integrating Knowledge from Disparate Sources," Proc. IJCAI, Vancouver, B.C., Aug., 1981, 319–325.

Kaven, "The Digital Doorman," PC Magazine, Nov. 16, 1999.

Lindqvist, et al, "Detecting Computer and Network Misuse Through the Production–Based Expert System Toolset (P–BEST)," Oct. 25, 1998.

Hartley, B., "Intrusion Detection Systems: What You Need to Know," Business Security Advisor Magazine, Doc # 05257, allegedly dated Sep. 1998, advisor.com/doc/05257, 7 pages, printed Jun. 10, 2003.

Hurwicz, M., "Cracker Tracking: Tighter Security with Intrusion Detection," BYTE.com, allegedly dated May 1998, www.byte.com/art/9805/sec20/art1.htm, 8 pages, printed Jun. 10, 2003.

"Networkers, Intrusion Detection and Scanning with Active Audit," Session 1305, ©1998Cisco Systems, www.cisco.com/networkers/nw99 pres/1305.pdf, 0893–04F9_c3.scr, printed Jun. 10, 2003.

(List continued on next page.)

Primary Examiner—Thomas M. Heckler
(74) Attorney, Agent, or Firm—Kin-Wah Tong; Moser, Patterson & Sheridan, LLP.

(57) ABSTRACT

A method of managing alerts in a network including receiving alerts from network sensors, consolidating the alerts that are indicative of a common incident and generating output reflecting the consolidated alerts.

57 Claims, 6 Drawing Sheets

U.S. PATENT DOCUMENTS

| | | | | |
|---|---|---|---|---|
| 5,991,881 | A | | 11/1999 | Conklin et al. ............. 713/201 |
| 6,009,467 | A | | 12/1999 | Ratcliff et al. .............. 709/224 |
| 6,052,709 | A | * | 4/2000 | Paul .......................... 709/202 |
| 6,070,244 | A | * | 5/2000 | Orchier et al. ............. 713/201 |
| 6,144,961 | A | * | 11/2000 | de la Salle ................... 707/10 |
| 6,396,845 | B1 | | 5/2002 | Sugita ........................ 370/449 |
| 6,453,346 | B1 | | 9/2002 | Garg et al. ................. 709/224 |
| 6,460,141 | B1 | * | 10/2002 | Olden ........................ 713/201 |
| 6,519,703 | B1 | | 2/2003 | Joyce ......................... 713/201 |
| 2002/0032717 | A1 | | 3/2002 | Malan et al. ............... 709/105 |
| 2002/0032793 | A1 | | 3/2002 | Malan et al. ............... 709/232 |
| 2002/0032880 | A1 | | 3/2002 | Poletto et al. .................. 714/4 |
| 2002/0035698 | A1 | | 3/2002 | Malan et al. ............... 713/201 |
| 2002/0138753 | A1 | | 9/2002 | Munson ...................... 713/201 |
| 2002/0144156 | A1 | | 10/2002 | Copeland, III ............. 713/201 |
| 2003/0037136 | A1 | | 2/2003 | Labovitz et al. ............ 709/224 |

OTHER PUBLICATIONS

Paller, A., "About the SHADOW Intrusion Detection System" Linux Weekly News, allegedly dated Sep. 1998, lwn.net/1998/0910/shadow.html, 38 pages, printed Jun. 10, 2003.

Cisco Secure Intrusion Detection System, Release 2.1.1, NetRanger User's Guide, Version 2.1.1, © 1998, Cisco Systems, Inc., allegedly released on Apr. 1998, www.cisco.com/univercd/cc/td/doc/product/iaabu//csids/csids3/index.htm, printed Jun. 10, 2003, 334 pages, (See CSI document listed at C7 below).

Cisco Secure Intrusion Detection 2.1.1 Release Notes, Table of Contents, Release Notes for NetRanger 2.1.1, © 1992–2002, Cisco Systems, Inc., , allegedly posted Sep. 28, 2002, 29 pages, www.cisco.com/univercd/cc/td/doc/product/iaabu/csids/csids3/nr11new.htm, printed Jun. 10, 2003.

R. Power, et al., "CSI Intrusion Detection System Resource", allegedly dated Jul. 1998, 216.239.57.100/search?q=cache:gvTCojxD6nMJ:www.gocsi.com/ques.htm+site:www.gocsi.com+ques&hl=en&ie=UTF–8, printed Jun. 16, 2003.

Debar et al., "A Neural Network Component for an Intrusion Detection System," © 1992 IEEE.

Denning et al, "Prototype IDES: A Real–Time Intrusion–Detention Expert System," SRI Project ECU 7508, SRI International, Menlo Park, California, Aug. 1987.

Denning et al., "Requirements and Model for IDES—A Real Time Intrusion–Detection Expert System," SRI Project 6169, SRI International, Menlo Park, CA, Aug. 1985.

Denning, "An Intrusion–Detection Model," SRI International, Menlo Park, CA Technical Report CSL–149, Nov. 1985.

Dowell, "The Computerwatch Data Reduction Tool," AT&T Bell Laboratories, Whippany, New Jersey.

Fox, et al., "A Neural Network Approach Towards Intrusion Detection," Harris Corporation, Government Information Systems Division, Melbourne, FL, Jul. 2, 1990.

Garvey, et al., "Model–Based Intrusion Detection," Proceedings of the 14th national Computer Security Conference, Washington, DC, Oct. 1991.

Ilgun et al., State Transition Analysis: A Rule–Based Intrusion Detection Approach, IEEE Transactions on Software Engineering, vol. 21, No. 3, Mar. 1995.

Javitz et al., "The SRI IDES Statistical Anomaly Detector," Proceedings of the IEEE Symposium on Security and Privacy, Oakland, CA, May 1991 pp. 316–326, IEEE Press.

Javitz et al., "The NIDES Statistical Component Description and Justification, SRI International Annual Report A010," Mar. 7, 1994.

Kaven, "The Digital Dorman," PC Magazine, Nov. 16, 1999.

Liepins, et al., Anomaly Detection; Purpose and Framework in Proceedings of the 12th National Computer Security Conference, pp. 495–504, Oct. 1989.

Lindquist, et al., "Detecting Computer and Network Misuse Through the Production–Based Expert System Toolset (P–BEST)," Oct. 25, 1998.

Lunt et al., "An Expert System to Classify and Sanitize Text" Proceedings of the 3rd Aerospace Computer Security Conference, Dec. 7–11, 1987, pp. 30–34.

Lunt, "A Survey of Intrusion Detection Techniques," Computers & Security, 12 (1993) 405–418.

Lunt, "Automated Audit Trail Analysis and Intrusion Detection: A Survey," Proceedings of the 11th National Computer Security Conference, Baltimore, MD Oct. 1988.

Lunt et al., "Knowledge–Based Intrusion Detection", Proceedings of the Al Systems in Government Conference, Washington DC, Mar. 1989.

Porras et al., "EMERALD: Event Monitoring Enabling Responses to Anomalous Live Disturbances," 20th NISSC—Oct. 9, 1997.

Porras et al., "Penetration State Transition Analysis A Rule–Based Intrusion Detection Approach," © 1992 IEEE.

Sebring et al., "Expert systems in intrusion detection: A case study". In Proceedings of the 11th National Computer Security Conference, pp. 74–81. Oct. 1988.

Shieh et al., "A Pattern–Oriented Intrusion–Detection Model and its Application," © 1991 IEEE.

Smaha, "Haystack: An intrusion detection system". In Proceedings of the Fourth Aerospace Computer Security Applications Conference, pp. 37–44, Dec. 1988.

Snapp, "Signature Analysis and Communication Issues in a Distributed Intrusion Detection System," Master's Thesis, Department of Compute Science University of California, Davis CA 95616, 1991.

Snapp et al., "DIDS (Distributed Intrusion Detection System—Motivation, Architecture, and an Early Prototype," Computer Security Laboratory, Division of Computer Science, Unic. of California, Davis, Davis, CA.

Tener, "Al and 4GL: Automated Detection and Investigation Tools", Proceedings of the IFIP Sec. '88, Australia, 1989, pp. 23–29.

Teng et al., "Adaptive Real–Time Anomaly Detection Using Inductively Generated Sequential Patterns," © 1990.

Vaccaro et al., "Detection of Anomalous Computer Session Activity," © 1989 IEEE.

Weiss,m "Analysis of Audit and Protocol Data using Methods from Artificial Intelligence," Siemens AG, Munich, West Germany.

Winkler, "A UNIX Prototype for Intrusion and Anomaly Detection in Secure Networks," © Planning Research Corp. 1990.

Boyen, et al., "Tractable Inference for Complex Stochastic Processes," Proceedings of the 14th Annual Conference on Uncertainty in Artificial Intelligence (UAI–98), pp. 33–42, Madison, WI, Jul. 24–26, 1998.

Copeland, J., "Observing Network Traffic–Techniques to Sold Out the Good, the Bad, and the Ugly," www.csc.gatech.edu/~copeland/8843/slides/Analyst–011027.ppt, allegedly 2001.

Farshchi, J., "Intrusion Detection FAQ, Statistical based approach to Intrusion Detection," www.sans.org/resources/idfaq/statistic ids.php, date unknown, printed Jul. 10, 2003.

Goan, T., "A Cop on the Beat, Collecting and Appraising Intrusion Evidence," Communication of the ACM, 42(7), Jul. 1999, 46–52.

Heberlein, et al., "A Network Security Monitor," Proceedings of the IEEE Symposium on Security and Privacy, May 07–09, 1990, Oakland, CA, pp. 296–304, IEEE Press.

Internet Security Systems, "Intrusion Detection for the Millenium," ISS Technology Brief, Date Unknown, pp. 1–6.

Jackson, et al., "An Expert System Application for Network Intrusion Detection," Proceedings of the 14th National Computer Security Conference, Washington, DC, Oct. 1–4, 1991.

Lankewicz, et al., "Real–time Anomaly Detection Using a Nonparametric Pattern Recognition Approach", Proceedings of the 7th Annual Computer Security Applications Conference, San Antonio, Texas, 1991, IEEE Press.

Lippmann, et al., "Evaluating Intrusion Detection Systems: The 1998 DARPA Off–line Intrusion Detection Evaluation," Proceedings of the 2000 DARPA, Information Survivability Conference and Exposition, Jan. 25–27, 2000, Hilton Head, SC, vol. 2, pp. 1012–1035, IEEE Press.

Miller, L., "A Network Under Attack, Leverage Your Existing Instrumentation to Recognize and Respond to Hacker Attacks," www.netscout.com/files/Intrusion 020118.pdf, Date Unknown, pp. 1–8.

Munson, et al., "Watcher: The Missing Piece of the Security Puzzle," Proceedings of the 17th Annual Computer Security Applications Conference (ACSAC'01), Dec. 10–14, 2001, New Orleans, LA, pp. 230–239, IEEE Press.

NetScreen, Products FAQ, www.netscreen.com/products/faq.html, Date Unknown.

Pearl, J., "Probabilistic Reasoning in Intelligent Systems: Networks of Plausible Inference," Morgan Kaufmann Publishers, Sep. 1988.

Porras, et al., "Live Traffic Analysis of TCP/IP Gateways," Proc. 1998 ISOC Symp. on Network and Distributed Systems Security, Dec. 12, 1997, 1–13.

Skinner, "EMERALD TCP Statistical Analyzer 1998 Evaluation Results," www.sdl.sri.com/emerald/98–eval–estat/index.html, Allegedly dated Jul. 9, 1999.

SRI/Stanford, "Adaptive Model–Based Monitoring and Threat Detection," Information Assurance BAA 98–34.

Staniford–Chen, et al., "GrIDS–A Graph Based Intrusion Detection System for Large Networks," Proceedings of the 19th National Information Systems Security Conference, vol. 1, pp. 361–370, Oct. 1996.

Tener, "Discovery: An Expert System in the Commercial Data Security Environment", Fourth IFIP Symposium on Information Systems Security, Monte Carlo, Dec. 1986.

Valdes, et al, "Adaptive, Model–based Monitoring for Cyber Attack Detection," Proceedings of Recent Advances in Intrusion Detection 2000 (RAID 2000), H. Debar, L. Me, F. Wu (Eds), Toulouse, France, Springer–Verlag LNCS vol. 1907, pp. 80–92, Oct. 2000.

Valdes, A., Blue Sensors, Sensor Correlation, and Alert Fusion, www.raid–symposium.org/raid2000/Materials/Abstracts/41/avaldes raidB.pdf, Oct. 4, 2000.

Valdes, et al., "Statistical Methods for Computer Usage Anomaly Detection Using NIDES (Next–Generation Intrusion Detection Expert System)," 3rd International Workshop on Rough Sets and Soft Computing, San Jose CA 1995, 306–311.

Wimer, S., "The Core of CylantSecure," White Papers, www.cylant.com/products/core.html, Date Unknown, Alleged © 1999–2003 Cylant Inc., pp. 1–4.

Zhang, et al., "A Hierarchical Anomaly Network Intrusion Detection System using Neural Network Classification," Proceedings of the 2001 WSES International Conference on Neural Networks and Applications (NNA'01), Puerto de la Cruz, Canary Islands, Spain, Feb. 11–15, 2001.

* cited by examiner

|  | —PRIORITY— | | |
|---|---|---|---|
| TYPE OF ATTACK | DENIAL OF SERVICE | INTEGRITY | SECURITY |
| "PING OF DEATH" | 90 | 10 | 10 |
| BUFFER OVERFLOW | 80 | 90 | 90 |
| WRITE - POLLING VIOLATION | 10 | 90 | 70 |
| USER1 | 0 | 20 | 80 |
| USER2 | 80 | 10 | 10 |

FIG. 3

NETWORK-BASED ALERT MANAGEMENT

This application claims priority under 35 USC §120 to U.S. patent application Ser. No. 09/188,739, filed on Nov. 9, 1998, now U.S. Pat. No. 6,321,338, the entire contents of which are hereby incorporated by reference.

GOVERNMENT RIGHTS IN THIS INVENTION

This invention was made with U.S. government support under contract numbers F30601-96-C-0294 and F30602-99-C-0187 awarded by the U.S. Air Force Research Laboratory. The U.S. government has certain rights in this invention.

TECHNICAL FIELD

This invention relates to network-based alert management.

BACKGROUND

Computer networks may include one or more digital security monitors or sensors that automatically analyze traffic on the network to identify potentially suspicious activity. The sensors may be implemented in either software or hardware. Monitors may focus on security monitoring and/or on fault analysis.

Upon detecting suspicious activity, the sensors typically generate some kind of digital alert message or signal, and attempt to bring that message to the attention of network I/S managers whose responsibility it is to respond and react in an appropriate defensive manner against hostile digital attacks or to recover quickly from catastrophic failures.

SUMMARY

In an aspect, the invention features a method of managing alerts in a network including receiving alerts from network sensors, consolidating the alerts that are indicative of a common incident and generating output reflecting the consolidated alerts. Alerts are formatted into a standard alert format by the network sensors or an input receiving logic of an alert management system, or a combination of both. The alert format may be selected from a group of formats including IDIP, SNMP, HP OpenView, Attach Specification CIDF and GIDO. Alerts may be tagged with corresponding significance scores where the significance scores may include a priority measure for the corresponding alerts. The priority measure may be derived from a priority map that can be automatically generated or dynamically adjusted. The priority map may contain relative priority scores for resource availability, resource integrity and resource confidentiality.

In another aspect, the invention features a method of managing alerts including receiving alerts from a number of network sensors, filtering the alerts to produce one or more internal reports and consolidating the internal reports that are indicative of a common incident-to-incident report. Related incident reports may be correlated. The network sensors may format the received alerts. Filtering includes deleting alerts that do not match specified rules. The filtering rules may be dynamically adjusted. Filtering may also include tagging alerts with a significance score that can indicate a priority measure and relevance measure.

Among the advantages of the invention may be one or more of the following.

The alert manager can be tailored to a particular application by dynamically adding or removing data connections to sources of incoming alerts, and by dynamically varying the process modules, user filter clauses, priority clauses, topology clauses, and output. Process modules may be added, modified, and deleted while the alert manager is active. Output may be configured for a variety of graphical user interfaces (GUIs). In embodiments, useful, for example, for each category of attack the user can define different priorities as related to denial of service, security, and integrity.

Process modules are logical entities within the alert manager that can respond to an incoming alert in real time and virtual time, i.e., data within an application can cause the alert manager to respond.

The alert manager can act as a sender or receiver. In embodiments, useful, for example, the alert manager can listen to a specific port in a network or connect to an external process on a host computer and process its data.

The alert management process can be an interpretive process allowing the incorporation of new process clauses and new rules.

The alert management process may provide a full solution for managing a diverse suite of multiparty security and fault monitoring services. Example targets of the alert management process are heterogeneous network computing environments that are subject to some perceived operational requirements for confidentiality, integrity, or availability. Inserted within the network are a suite of potential multiparty security and fault monitoring services such as intrusion detection systems, firewalls, security scanners, virus protection software, network management probes, load balancers, or network service appliances. The alert management process provides alert distributions within the monitored network through which security alerts, fault reports, and performance logs may be collected, processed and distributed to remote processing stations (e.g., Security Data Centers, Administrative Help Desks, MIS stations). Combined data produced by the security, fault, or performance monitoring services provide these remote processing stations detailed insight into the security posture, and more broadly the overall health, of the monitored network.

Value may be added to the content delivered by the alert management process to the remote processing station(s) that subscribe to alerts in the form of an advanced alert processing chain. For example, alerts received by the alert management process and prepared for forwarding to a remote processing station, may be filtered using a dynamically downloadable message criteria specification.

In a further aspect, alerts may be tagged with a priority indication flag formulated against the remote processing station's alert processing policy and tagged with a relevance flag that indicates the likely severity of the attack with respect to the known internal topology of the monitored network.

In a further aspect of the invention, alerts may be aggregated (or consolidated) into single incident reports when found to be associated with a series of equivalent alerts produced by the same sensor or by other sensors, based upon equivalence criteria, and the incident reports forwarded to the remote processing station.

The alert management system is configurable with respect to the data needs and policies specified by the remote processing station. These processes are customizable on a per remote processing station basis. For example, two remote processing stations may in parallel subscribe to alerts from the alert management process, with each having individual filtering policies, prioritization schemes, and so forth, applied to the alert/incident reports it receives.

Other features and advantages will become apparent from the following description and from the claims.

DESCRIPTION OF DRAWINGS

FIG. 3 is a block diagram of a priority database record.

Like reference symbols in the various drawings indicate like elements.

DETAILED DESCRIPTION

Figure 1:
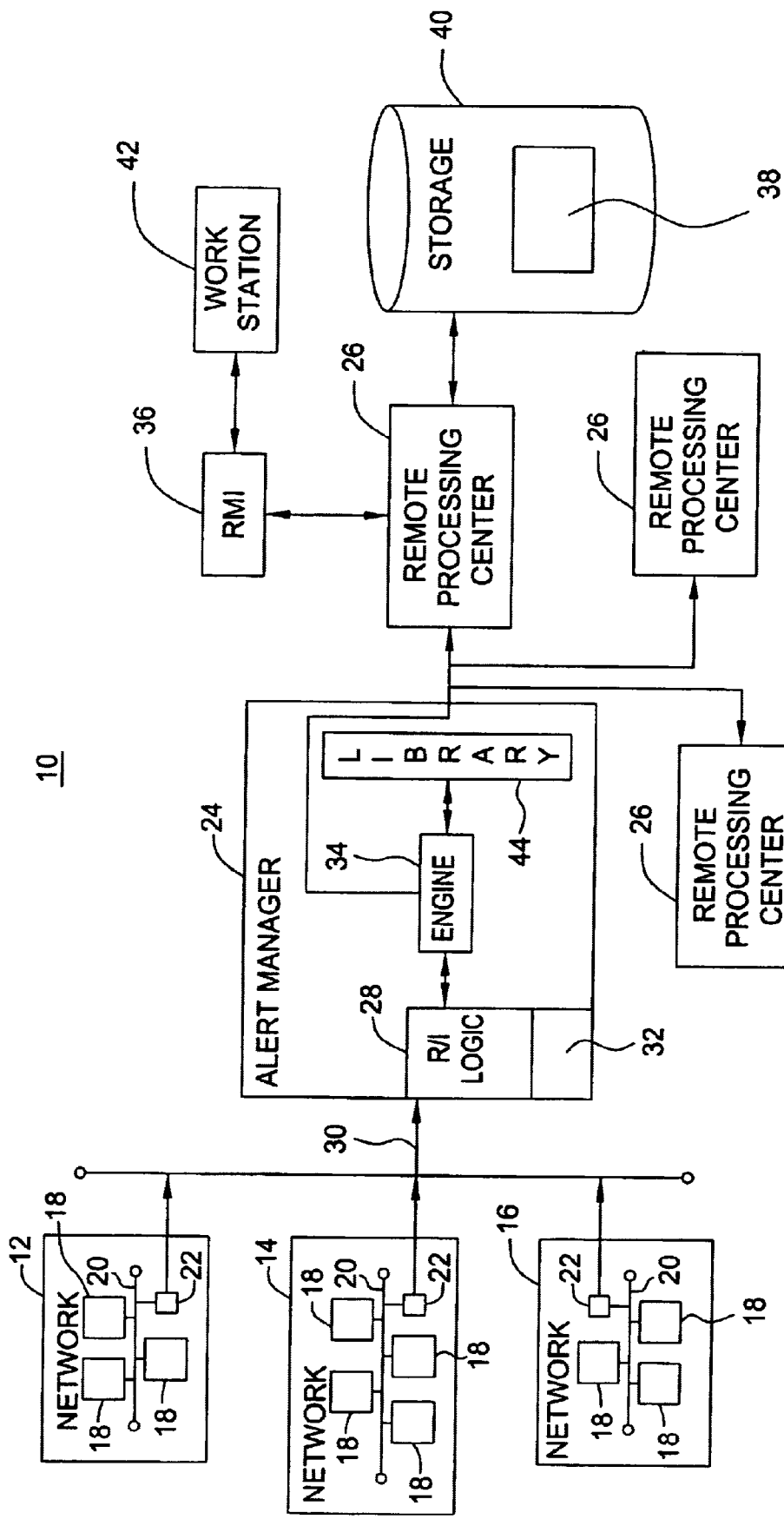
FIG. 1 is a block diagram of a network based alert management system.

Referring to FIG. 1, a network based alert management system 10 includes a network 12, a network 14, and a network 16. Each of the networks 12–14 includes a number of computer systems collectively labeled 18, interconnected, for example, by an Ethernet cable 20. Each of the networks 12–14 includes security and fault monitoring systems generally labeled 22. Each security and fault monitoring system 22 is linked to an alert manager 24. The alert manager 24 is linked to one or more remote processing centers generally labeled 26. Each alert processing center 26 includes a remote management interface 36 (shown on only one center 26 by way of example). The remote management interface 36 provides a user (not shown) the capability of configuring reports produced by the alert manager 24.

The security and fault monitoring systems 22 may include, for example, intrusion detection systems, firewalls, security scanners, virus protection software, network management probes, load balancers, and network service appliances. Each of the security and fault monitoring systems 22 produces an alert stream in the form of, for example, security alerts, fault reports, and performance logs. The alert stream is sent to the alert manager 24 for collection, processing, and distribution to the remote processing center 26. Example remote processing centers 26 are security data centers, administrative help desks, and MIS stations.

In an embodiment, the remote processing center 26 subscribes to the alert manager 24 which in turns distributes specific collected and processed alert information to the remote processing center 26, more fully described below.

The networks 14, 14, and 16 being monitored by the security and fault monitoring systems 22 may include any computer network environment and topology such as local area networks (LAN), wide area networks (WAN), Ethernet, switched, and TCP/IP-based network environments. Network services occurring within the networks 12–16 include features common to many network operating systems such as mail, HTTP, ftp, remote log in, network file systems, finger, Kerbebos, and SNMP. Each of the sensors 22 monitors various host and/or network activity within the networks 12–16, and each sensor 22, as discussed above, generate a stream of alerts, triggered by potentially suspicious events, such as network packet data transfer commands, data transfer errors, network packet data transfer volume, and so forth. The alerts indicate a suspicion of possible malicious intrusion or other threat to operations within the networks 12–16.

The alert manager 24 includes a receive-input logic module 28. In an embodiment, the receive-input logic 28 of the alert manager 24 subscribes, i.e., establishes a transport connection, to receive each of the alert streams produced by the sensors 22 through a secure electronic communication line (SSL) 30. The alert streams contain raw, i.e., unprocessed, alerts. The monitors 22 may format their respective alert streams in a variety of formats, such as IDIP, SNMP, HP Openview, an XML-based standard format (such as the Attack Specifications from IETF), Common Intrusion Detection Framework (CIDF), GIDOs, or some other format. The receive-input logic 28 of the alert manager 24 is equipped with translation modules 32 to translate the original, raw alert streams from the monitors 22 into a common format for further processing, if the alerts do not arrive in the common format.

In another embodiment, the monitors 22 include conversion software (not shown), also referred to as "wrapper" software that translates a monitor's raw alert stream into the common format used by the alert manager 24. The wrapper software can add data items of interest to the alert manager 24, by querying its network 12–16.

In another embodiment, a combination of monitors 22 having wrapper software and the receive-input logic 28 preprocessing raw alerts in the alert management network 10 are present to accommodate a heterogeneous base of monitors 22 that an end-user desires to manage.

The alert manager 24 includes an alert processing engine 34. Raw alerts received by the receive-input module 28 and formatted into the common format are sent to the alert processing engine 34.

Figure 2:
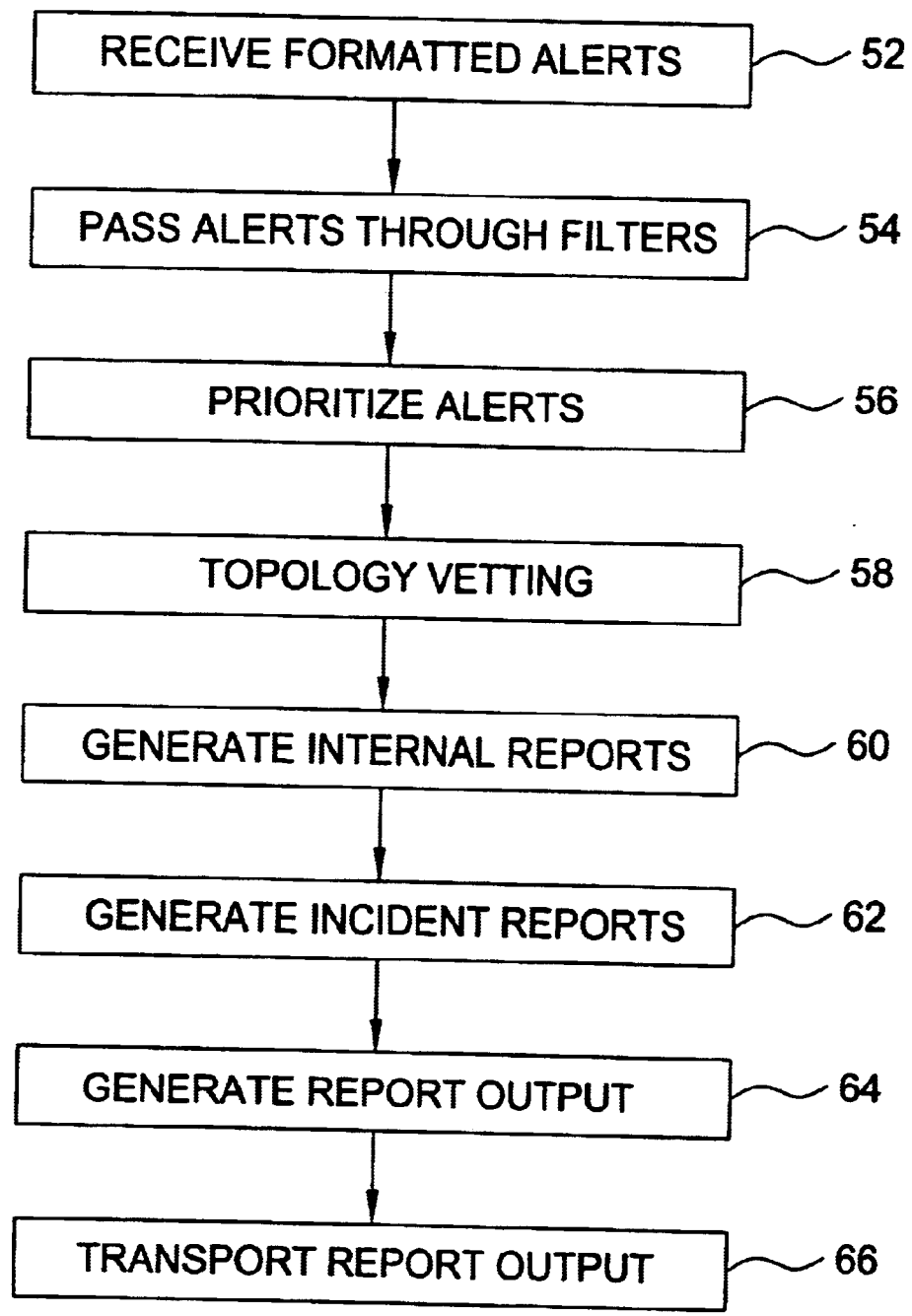
FIG. 2 is a flow diagram of an alert management process.

Referring to FIG. 2, an alert management process 50 residing in the alert processing engine 34 includes receiving 52 formatted alerts from the receive-input logic 28. The formatted alerts are passed 54 through user-specified filters and alerts not matching criteria of the user-specified filters are discarded.

For example, a particular end-user subscriber may be responsible only for a portion of the overall operations network and may only wish to see alerts coming from a particular subset of monitors 22, e.g., from particular ports. Each end-user subscriber can interactively define his or her own customized user-specified filters using the remote management interface 36 of the remote processing center 26, fully described below.

The filtered alerts are prioritized 56, i.e., rated or scored according to priorities dynamically controlled by the user. In an embodiment, the priority of an alert is determined by analyzing the known, (relative) potential impact of the attack category identified with respect to each of various concerns such as confidentiality, data integrity, and system availability. Confidentiality involves allowing only authorized users to view network data. Data integrity involves allowing only authorized persons to change data. System availability involves providing users access to data whenever needed with minimum downtime.

Different categories of known computer intrusions and anomalies generally pose threats with differing levels of impact on each of the above three concerns. In addition, for different users and different applications, each of the concerns may be of different relative priority. For example, in a general Internet news/search portal like Yahoo! or Lycos, continuous availability may be a more important concern than confidentiality. Conversely, for a government intelligence database, confidentiality may be a greater priority than continuous availability. For an e-commerce business site, all three concerns may be of roughly equal seriousness and priority. An ultimate priority score assigned to a particular alert for a given end-user during prioritization 56 reflects a sum or combination of the identified attack's potential adverse impact along each of the dimensions of interest (confidentiality, data integrity, and system availability), weighted by the end-user's individual profile of relative priority for each such dimension.

In an embodiment, a default priority profile is provided for each user or subscriber that assigns equal priority to confidentiality, data integrity, and system availability. In a preferred embodiment, the end-user may configure the priorities dynamically, and modify the default values as desired, through the remote management interface 36 that gives the user the flexibility to customize priority assignments in a manner that reflects his/her unique concerns.

In an another embodiment, users (or system developers) directly assign a relative priority score to each type of attack, instead of ranking more abstract properties such as integrity or availability, that allows more precise reflection of a user's priorities regarding specific attacks, but requires more initial entry of detailed information.

In an embodiment, users may register a listing of critical services, identified by <host ID, protocol> pairs, as to whom potential attacks or operational failures are considered to be of especially high priority.

Management and alteration of filters and listings of critical services in accordance with each of the prioritization methodologies described above can are performed dynamically and interactively while alert manager 24 is in operation and as user priorities change using the remote management interface 36.

The alerts are topology vetted 58. Vetting 58 provides a relevance rating to alerts based on the topological vulnerability of the network being monitored to the type of attack signaled by the alert. Example topologies include the computing environment, what kind of operating system (O/S), network infrastructure, and so forth. In a preferred embodiment, vetting 58 utilizes a mapping between each network host and an enumeration of that host's O/S and O/S version(s). Vetting step 58 further preferably utilizes a topology relevance table indicating the relevance of various types of attacks to each of the different possible OS/version environments. Thus, to determine and assign a relevance score for a particular alert, the host ID (hostname/IP address) for the target of that alert can be used to retrieve its OS/version information, and the OS/version along with the attack type of the alert can be used to retrieve a relevancy score from the topology table.

In an embodiment, the topology table of the network being monitored is dynamically configurable by end users through the remote management interface 36.

In another embodiment, automatic local area network (LAN) mapping is provided by a network topology scope application.

The relevance of various types of known attacks against different topologies is preferably specified in predefined maps, but dynamically configured using the remote management interface 36.

Internal reports are generated 60 from the output of filtering 54, prioritizing 56 and vetting 58. Internal reports generally include fewer alerts as compared with the original raw alert stream, as a result of the user-configured filtering 40. Internal reports also tag or associate each alert with priority and/or relevance scores as a result of priority mapping 56 and topology vetting 58, respectively.

The internal reports are used to generate 62 consolidated incident reports. A consolidated incident report adds perspective and reduces information clutter by merging/combining the internal reports for multiple alerts into a single incident report. In a preferred embodiment, generating 62 is carried out through report aggregation and equivalence recognition. Aggregation refers to combining alerts produced by a single sensor, whereas equivalence recognition refers to combining alerts from multiple sensors.

The underlying notion in both cases is that nominally different alerts may actually represent a single intrusion "incident" in the real world. By analogy, a single criminal intrusion into a physical property might trigger alarms on multiple sensors such as a door alarm and a motion detector that are instrumented on the same premises, but from an informational perspective both alarms are essentially signaling the same event.

In an embodiment, alert parameters examined for report aggregation include a variable combination of attack type, timestamp, monitor identification (ID), user ID, process ID, and <IP, port addresses> for the source and target of the suspicious activity.

When an internal report is generated 60 alerts are consolidated and the corresponding priority and relevance tags for the individual alerts are merged into single meta-priority/meta-relevance scores for the single incident. Different functions may be utilized for doing the priority blend, such as additive, min/max, average, and so forth. Duration of the overall incident is also preferably computed and associated with the incident, based on the time stamps of the various individual alerts involving the incident.

The consolidated incident reports are used to generate 64 a report output. Formatting of the output report is based on subscriber-customized criteria that are defined using the remote management interface 36. The report output is transported 66 to the remote processing center 26.

Selection of a transport is under user control and managed using the remote management interface 36. The user may specify, for example, E-mail, XML, HTML and/or writing out to a file. In an embodiment, the transport occurs over an SSL for display and assessment by the end-user.

The filtering 54, prioritization 54 and topology vetting 58 are event driven, i.e., each alert is processed and filtered/tagged as it arrives, one alert at a time. However, temporal clauses are utilized for aspects of report aggregation and equivalence recognition among multiple alerts. For example, as internal reports are generated 60 a sliding window is established during which additional records may be merged into the aggregate incident report. A single-alert internal report may be sent to the remote processing center 26 indicating that it has witnessed the alert. A subsequent aggregate alert report, i.e., an incident report, covering that single alert as well as others, may also be forwarded to the remote processing center 26 to indicate a duration of the attack/incident, an aggregate count of individual alerts representing this incident, and an aggregate priority. In an embodiment, aggregate alert flushing may occur after some period of inactivity (e.g., "two minutes since last event"). The aggregate alert flushing is not event driven, but rather driven by an internal timeout recognized from a system clock (not shown) of the alert manager 24.

Referring to FIG. 3, an exemplary priority database record 80 used for prioritization 56 of filtered alerts includes example network attacks ping of death 82, buffer overflow 84 and write polling violation 86. For each of the attacks 82–86, a relative priority rating is assigned, namely, denial of service (system availability) 88, data integrity 90, and security (confidentiality) 92. By way of example, a first end-user 94 weights denial of service at 0%, data integrity at 20%, and security at 80%. A second end-user 96 weights denial of service at 80%, data integrity at 10% and security at 10%. Thus, for the priority database record 80, the user 94 emphasizes a high concern (priority) with security, while the user 96 emphasizes a high concern (priority) with denial of service.

In this example, for first user 94 a "ping of death" alert 82 will have a priority score=(0*90)+(0.2*10)+(0.8*10)=10; whereas for second user 96 a "ping of death" alert 82 will receive a priority score=(0.8*90)+(0.1*10)+(0.1*10)=74.

As is seen from the description above, (a) it is the relative value of these priority scores that has significance, not the absolute magnitudes, and (b) the priority values for alerts and for user preferences are subjective values that may vary from one application to another and from one user to another. As noted above, the alert priority map values and user priority profiles may be dynamically adjusted and customized by individual users via remote management interface 36.

Referring again to FIG. 1, the report output of the alert processing process 50 is stored at the remote processing center 26 in a database 38 contained in a storage device 40 for retrieval and reporting by the end user. In an embodiment, the report output is translated at the remote processing center 26 in accordance with a user-configurable database schema into an existing/legacy database management system (not shown) contained in the remote processing center 26 for convenience of the end-user, either manually by a database integration team or automatically using a database mediator/translator. The remote management interface 36 accesses the database management system and presents the report output to the end-user, such as by a graphical user interface (GUI) on a workstation 42.

In an embodiment, the alert management network 10 provides an open, dynamic infrastructure for alert processing and management. The alert manager 24 preferably includes functionality for dynamically generating, suspending, and configuring data connections and logical process modules, in response to interactive remote user commands issued via remote management interface 36. The remote management interface 36 preferably executes a java application that generates command files, in response to end user requests, in the form of directives and any necessary data files, such as the priority database record 80, and so forth. The java application communicates, e.g. via telnet, to the alert manager 24 and downloads the directives and data files. The alert processing engine 34, preferably a postscript interpreter in one embodiment, can process the directives dynamically. Many of the directives are preferably defined in terms of postscript code that resides locally in a library 44 in the alert manager 24. Applications running in alert manager 24 are written in modular fashion, allowing directives to accomplish meaningful change of logical behavior by instructing the alert manager 24 to terminate a particular process clause and activate a newly downloaded clause, for example.

By way of another example, through the operation of the alert processing engine 34 the alert manager 24 can dynamically establish and suspend connections to the various alert streams generated by the security and fault monitoring systems 22. Thus, the alert manager 24 can dynamically "plug into" (i.e., connect) new alert streams, such as alert streams from additional sensors newly deployed by an end-user, and likewise can dynamically suspend (permanently or temporarily) its connection to alert streams from sensors 22 that are removed, replaced, taken offline, and so forth. Similarly, alert manager 24 can dynamically generate or suspend modules of the alert management process 50, and can dynamically adjust the configurable parameter settings of those modules.

In this manner, alert manager 24 is designed to be responsive to dynamic configuration requests initiated by end users using the remote management interface 36 of the remote processing center 26. As mentioned above, the remote management interface 36 provides an interactive interface at workstation 42 for end-users to specify desired modifications to the dynamically configurable aspects of alert manager 24.

Figure 4:
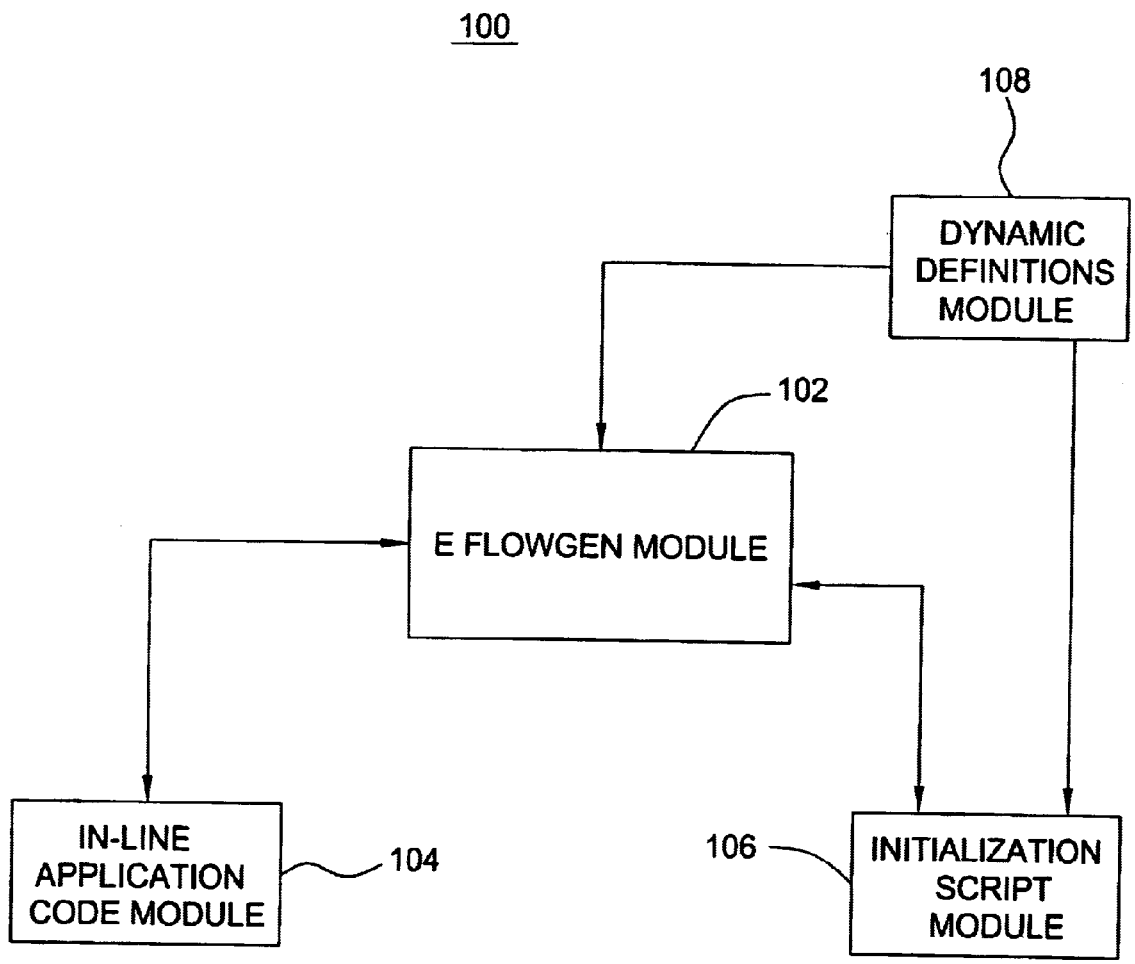
FIG. 4 is a block diagram of the remote processing center.

Referring to FIG. 4, a block diagram of a software architecture 100 for a dynamic, open, alert management infrastructure in accordance with preferred embodiments of the present invention is shown. An infrastructure module 102 (labeled "eFlowgen") provides core infrastructure functionality, including implementation of the alert processing engine 34, and need not be specialized to alert management applications. An inline application code module 104 (in conjunction with an initialization module 106, described below) defines an alert management application, including the overall alert analysis and reporting process 50 described above with reference to FIG. 2. Initialization script module 106 complements application code module 104, by defining, for a particular application instance, the specifics of the input/output transport connections and specifics of the logical alert processing clauses corresponding to the process 50. A dynamic definitions module 108 represents dynamic changes submitted by users via the remote management interface 36, such as configuration changes and other extensions as previously discussed; the functionally dynamic definitions module 180 are comparable to initialization script module 106, except for being dynamically submitted and incorporated into the running application.

A detailed functional specification for a software infrastructure corresponding to eFlowgen module 102 is included in the Appendix, incorporated herein.

Figure 5:
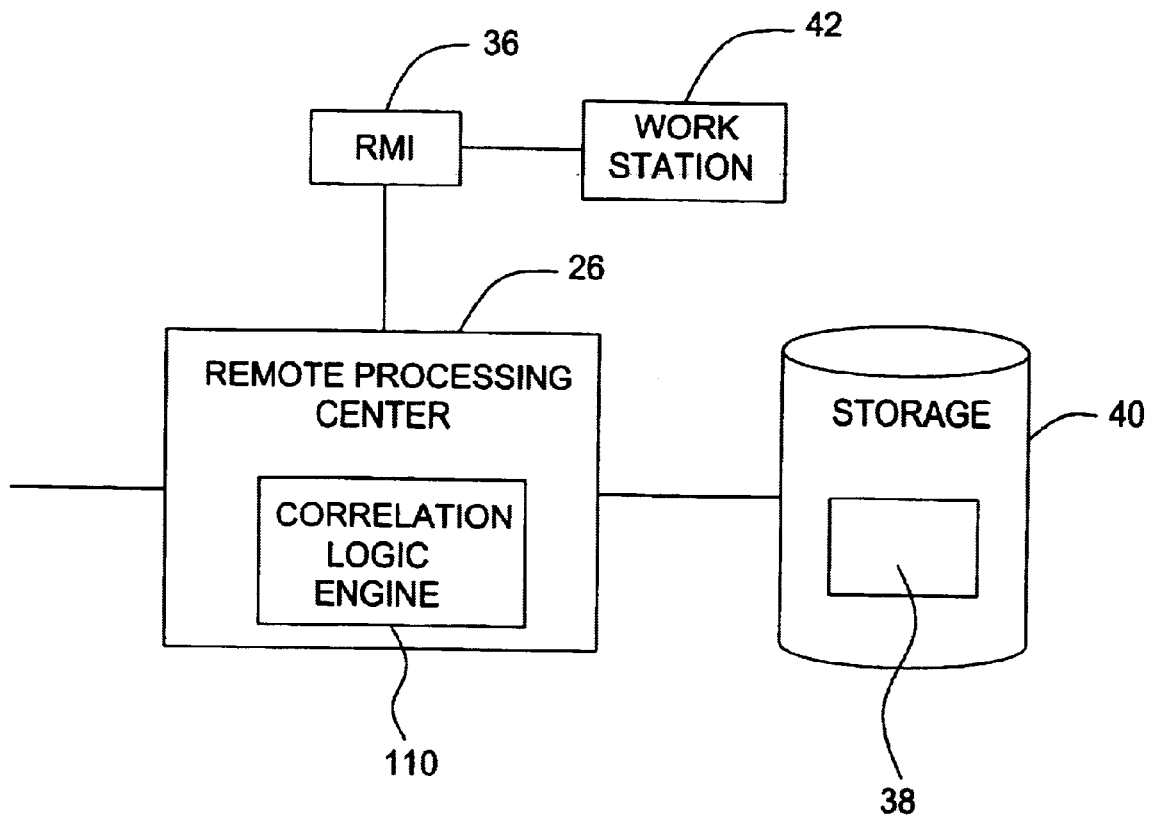
FIG. 5 is a block diagram of a software architecture for the alert management system.

In another embodiment, referring to FIG. 5, the remote processing center 26 includes a correlation logic engine 110. The correlation logic engine 110 accesses and compares incident reports in database 38 and attempts to provide intelligent assistance to end-users in the analytical task of discovering patterns and making sense of alert data. The correlation engine logic 110 looks for key attribute relations in common for different incidents, such as incidents targeting a single host machine over a relatively short time frame, or incidents reflecting attacks or anomalies coming from a particular source machine. Automatically correlating separate incidents helps end-users recognize more quickly that a particular machine is under serious attack or that some other machine is a hostile "bad guy," for example, and the end-users can then take appropriate defensive action.

Another correlation technique residing in the correlation logic engine 110 looks for interrelated vulnerabilities, applying rule-based knowledge to look for groups of distinct incidents that can inferentially be interpreted as related parts of a single, coordinated attack. For example, rules matching patterns of incidents that look like a chain over time, where the target of an earlier incident becomes the source of a subsequent incident, may allow correlation logic engine 110 to conclude that these likely are not unrelated incidents, and that a "worm" infection appears to be spreading.

In an embodiment, the correlation logic engine 110 incorporates statistical inferential methods. The correlation logic engine 110 attempts to draw conclusions automatically based on received intrusion incident reports. The correlation logic engine 110 produces reports for the end-user indicating correlation found.

The alert manager 24 and other components of the alert management network 10 may be implemented and executed on a wide variety of digital computing platforms, including, but not limited to, workstation-class computer hardware and operating system software platforms such as Linux, Solaris, FreeBSD/Unix, and Windows-NT.

Figure 6:
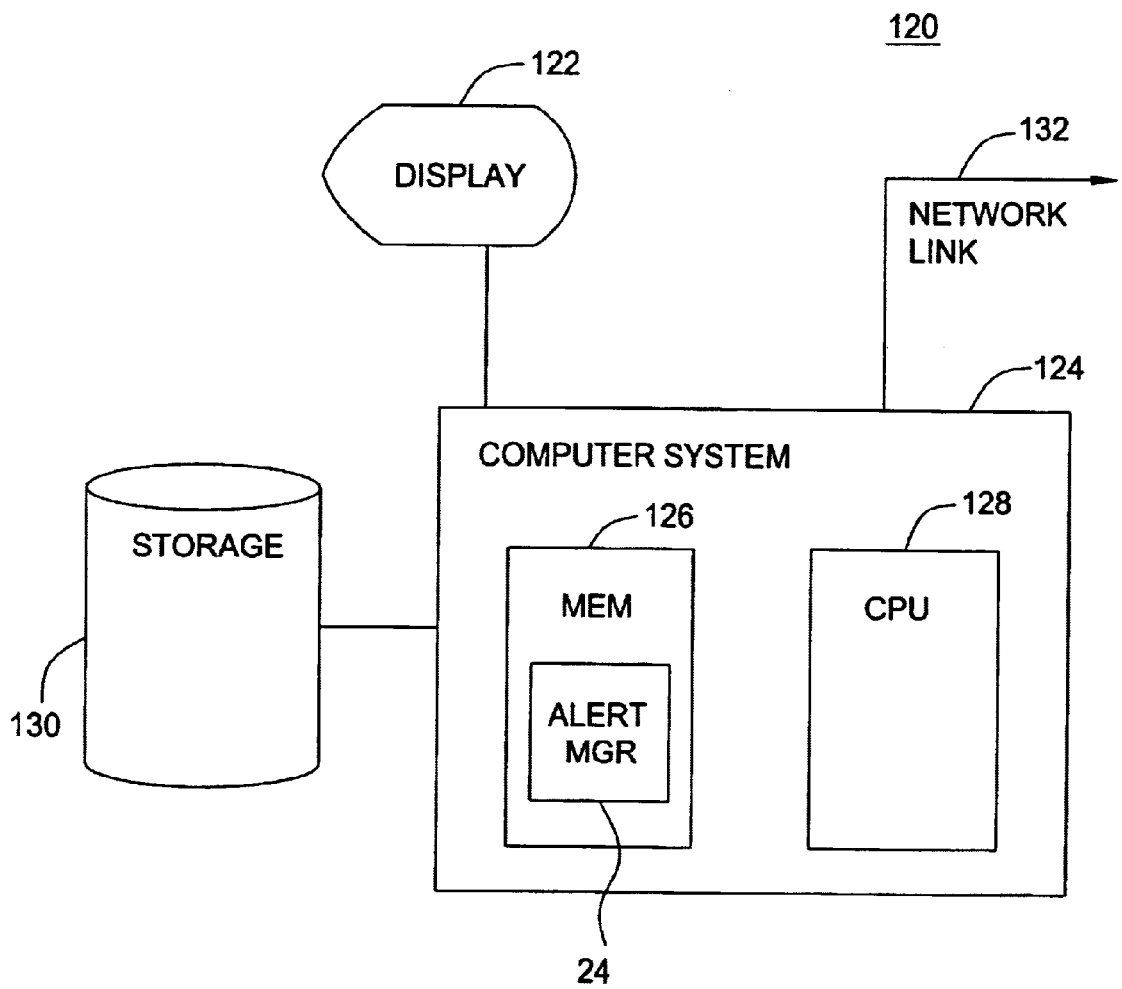
FIG. 6 is a block diagram of a computer platform.

Referring to FIG. 6, a computer platform 120 suitable for hosting and executing the alert management process 50 includes a display device 122 connected to a computer 124. The computer 124 includes at least a memory 126 and a central processing unit (CPU) 128. The computer 124 includes a link to a storage device 130 and a network link 132.

The storage device 130 can store instructions that form an alert manager 24. The instructions may be transferred to the memory 126 and CPU 128 in the course of operation. The instructions for alert manager 24 can cause the display device 122 to display messages through an interface such as a graphical user interface (GUI). Further, instructions may be stored on a variety of mass storage devices (not shown).

Other embodiments are within the scope of the following claims.

What is claimed is:

1. A computer-implemented method of managing alerts in a network comprising:
   receiving alerts from network sensors;
   consolidating the alerts that are indicative of a common incident; and
   generating output reflecting the consolidated alerts.

2. The computer-implemented method of claim 1 further comprising formatting the alerts into a standard alert format.

3. The computer-implemented method of claim 2 wherein formatting the alerts into a standard alert format is performed by the network sensors.

4. The computer-implemented method of claim 2 wherein formatting the alerts into a standard alert format is performed by input-receiving logic of an alert management system.

5. The computer-implemented method of claim 2 wherein the alert format is selected from the following group of formats: {IDIP, SNMP, HP Openview, Attach Specification, CIDF, XML}.

6. The computer-implemented method of claim 1 further comprising tagging the alerts with corresponding significance scores.

7. The computer-implemented method of claim 6 wherein the significance scores comprise a component indicating a priority measure for the corresponding alerts.

8. The computer-implemented method of claim 7 wherein the priority measure is derived using a priority map.

9. The computer-implemented method of claim 8 wherein the priority map is dynamically adjustable.

10. The computer-implemented method of claim 8 wherein the priority map comprises relative priority scores for resource availability, resource integrity, and resource confidentiality.

11. The computer-implemented method of claim 7 wherein the priority measure is derived based upon criticality of one or more resources targeted by the corresponding alerts.

12. The computer-implemented method of claim 6 wherein the significance scores comprise a component indicating a relevance measure for the corresponding alerts.

13. The computer-implemented method of claim 12 wherein the relevance measure is derived based upon a consideration of an operating environment topology for a target of an attack signaled by the corresponding alert.

14. The computer-implemented method of claim 13 wherein the relevance measure is derived using one or more topology tables.

15. The computer-implemented method of claim 14 wherein one or more-elements of the topology tables are dynamically adjustable.

16. The computer-implemented method of claim 14 wherein one or more elements of the topology tables are automatically generated.

17. The computer-implemented method of claim 14 wherein the one or more topology tables comprise:
   a mapping between one or more network hosts and one or more corresponding environment features selected from the following group: {operating systems (o/s), o/s versions, hosted services/applications}; and
   a relevance rating for each of one or more types of attacks mapped against the corresponding environment features.

18. The computer-implemented method of claim 6 wherein the output reflecting the consolidated alerts includes a meta-significance score reflecting a blending of the significance scores for each of the consolidated alerts.

19. The computer-implemented method of claim 1 further comprising correlating common incidents.

20. The computer-implemented method of claim 1 further comprising filtering the alerts.

21. The computer-implemented method of claim 20 wherein filtering comprises comparing the alerts to user-specified filters.

22. The computer-implemented method of claim 21 wherein the user-specified filters are dynamically configurable.

23. The computer-implemented method of claim 1 wherein the consolidated alerts comprise alerts produced by a single network sensor.

24. The computer-implemented method of claim 1 wherein the consolidated alerts comprise alerts produced by different network sensors.

25. The computer-implemented method of claim 1 wherein consolidating the alerts further comprises identifying the alerts that are indicative of a common incident based upon one or more alert parameters selected from the following group: {attack type, timestamp, network security component identification (ID), user ID, process ID, <IP, port addresses> for a source and a target of a suspicious activity}.

26. The computer-implemented method of claim 1 wherein generating output comprises generating one or more subscriber-specific reports.

27. The computer-implemented method of claim 26 wherein the subscriber-specific reports are based on one or more subscriber-customizable criteria.

28. The computer-implemented method of claim 27 wherein the subscriber-customizable criteria are dynamically configurable.

29. The computer-implemented method of claim 27 wherein the subscriber-customizable criteria comprise one or more transport options.

30. The computer-implemented method of claim 29 wherein the transport options comprise one or more options selected from the following group: {E-mail, XML, HTML, writing out to a file}.

31. The computer-implemented method of claim 1 wherein the output is automatically input to a data base management system.

32. The computer-implemented method of claim 1 further comprising sending the output over one or more secure communications links to one or more subscribers.

33. The computer-implemented method of claim 1 wherein receiving alerts further comprises dynamically modifying a set of network sensors from whom the alerts are received.

34. The computer-implemented method of claim 1 wherein the network sensors comprise heterogeneous network sensors.

35. The computer-implemented method of claim 1, wherein the received alerts include one or more filtered alerts.

36. The computer-implemented method of claim 1, wherein the received alerts include one or more alerts tagged with corresponding significance scores.

37. The computer-implemented method of claim 1, wherein the received alerts include one or more consolidated alerts, as to which the method of claim 1 is applied in recursive fashion.

38. The computer-implemented method of claim 1, further comprising processing the alerts to produce one or more internal reports, and wherein consolidating comprises consolidating the internal reports that are indicative of a common incident to produce one or more incident reports.

39. A computer program, residing on a computer-readable medium, comprising instructions causing a computer to:
  receive alerts from a plurality of network sensors;
  consolidate the alerts that are indicative of a common incident; and
  generate output reflecting the consolidated alerts.

40. The computer program of claim 39, further comprising instructions causing a computer to:
  format the alerts;
  filter the alerts; and
  tag one or more of the alerts with corresponding significance scores.

41. The computer program of claim 39 wherein the network sensors comprise heterogeneous network sensors.

42. In a computer network that has a plurality of security or fault monitoring devices of various types, each of which generates an alert when an attack or anomalous incident is detected, a method for managing alerts comprising the steps of:
  ranking network resources and services based on their actual or perceived importance to effective operation of the network;
  receiving alerts from the security or fault monitoring devices;
  ranking each alert based on a potential or actual impact of each alert's underlying attack or incident on effective operation of the network;
  grouping alerts that may relate to a common attack or incident; and
  generating a report that shows at least a subset of the alert groups and that indicates a potential or actual impact of each alert group's underlying attack or incident on effective operation of the network.

43. In a computer network that has a plurality of security or fault monitoring devices of various types, each of which generates an alert when an attack or anomalous incident is detected, a method for managing alerts comprising the steps of:
  ranking network resources and services based on their actual or perceived importance to effective operation of the network;
  receiving alerts from the security or fault monitoring devices;
  grouping alerts that may relate to a common attack or incident;
  ranking each alert group based on a potential or actual impact of each alert group's underlying attack or incident on effective operation of the network; and
  generating a report that shows at least a subset of the alert groups and that indicates a potential or actual impact of each alert group's underlying attack or incident on effective operation of the network.

44. In a computer network that has a plurality of security or fault monitoring devices of various types, each of which generates an alert when an attack or anomalous incident is detected, a method for managing alerts comprising the steps of:
  receiving alerts from the security or fault monitoring devices;
  grouping alerts that may relate to a common attack or incident;
  ranking each alert group based on a potential or actual impact of each alert group's underlying attack or incident on effective operation of the network; and
  generating a report that shows at least a subset of the alert groups and that indicates a potential or actual impact of each alert group's underlying attack or incident on effective operation of the network.

45. The method of claim 44 wherein the security or fault monitoring devices are selected from the following group of devices:
  firewalls;
  intrusion detection systems;
  antivirus software;
  security scanners;
  network management probes;
  network service appliances;
  authentication services; and
  host and application security services.

46. The method of claim 44 further comprising the step of identifying critical network services and resources.

47. The method of claim 44 further comprising the step of ranking network resources and services based on their actual or perceived importance to effective operation of the network.

48. The method of claim 44 further comprising the step of identifying a set of alert classes or types.

49. The method of claim 48 wherein the set of alert classes or types is selected from the following group:
  privilege subversion;
  use subversion;
  denial of service;
  intelligence gathering;
  access violations;
  integrity violations;
  system environment corruption;
  user environment corruption;
  asset distress; and
  suspicious usage.

50. The method of claim 49 further comprising the step of ranking the alert classes or types based on actual or perceived impact of the underlying attacks or incidents on effective operation of the network.

51. The method of claim 44 wherein the alerts are grouped based on alert attributes selected from the following group:
  common source;
  common connection;
  common host-based session;

common alert type or class; and information about alert equivalence from an external data base.

52. The method of claim 44 wherein the alert groups are ranked based on criteria selected from the following group:

attack outcome;

attack vulnerability;

target of the attack;

alert class;

attacker identity; and user identity.

53. The method of claim 52 wherein the criteria are assigned weights that are dynamically adjustable.

54. The method of claim 44 wherein the alert report further includes information selected from the following group:

alert class;

alert group rank, duration of the attack or incident; and name, location, and version of the security or fault monitoring devices that generated alerts.

55. In a computer network, a method for ranking alerts that are indicative of an attack or an anomalous incident, the method comprising the steps of:

identifying and ranking different types of attacks or incidents according to their actual or perceived impact on effective operation of the network;

identifying and ranking network resources or services according to their actual or perceived importance to effective operation of the network;

determining vulnerability of network resources to different types of attacks or incidents; and assigning a relevance score to an alert based on the type of the underlying attack or incident, the target of the attack-or incident, and the vulnerability of the target.

56. The method of claim 55 wherein an attack outcome measurement is also used in the assignment of the relevance score.

57. The method of claim 55 wherein the relevance score is assigned in part by associating dynamically adjustable weights with the type of the underlying attack or incident, the target of the attack or incident, and the vulnerability of the target.

* * * * *